Jan. 5, 1960  A. M. OLSON  2,919,933
LANDING GEAR INTERLOCKING MECHANISM FOR TOWING THE AIRCRAFT
Filed July 12, 1957  6 Sheets-Sheet 1

INVENTOR.
ALBERT M. OLSON
BY
George C. Sullivan
Agent

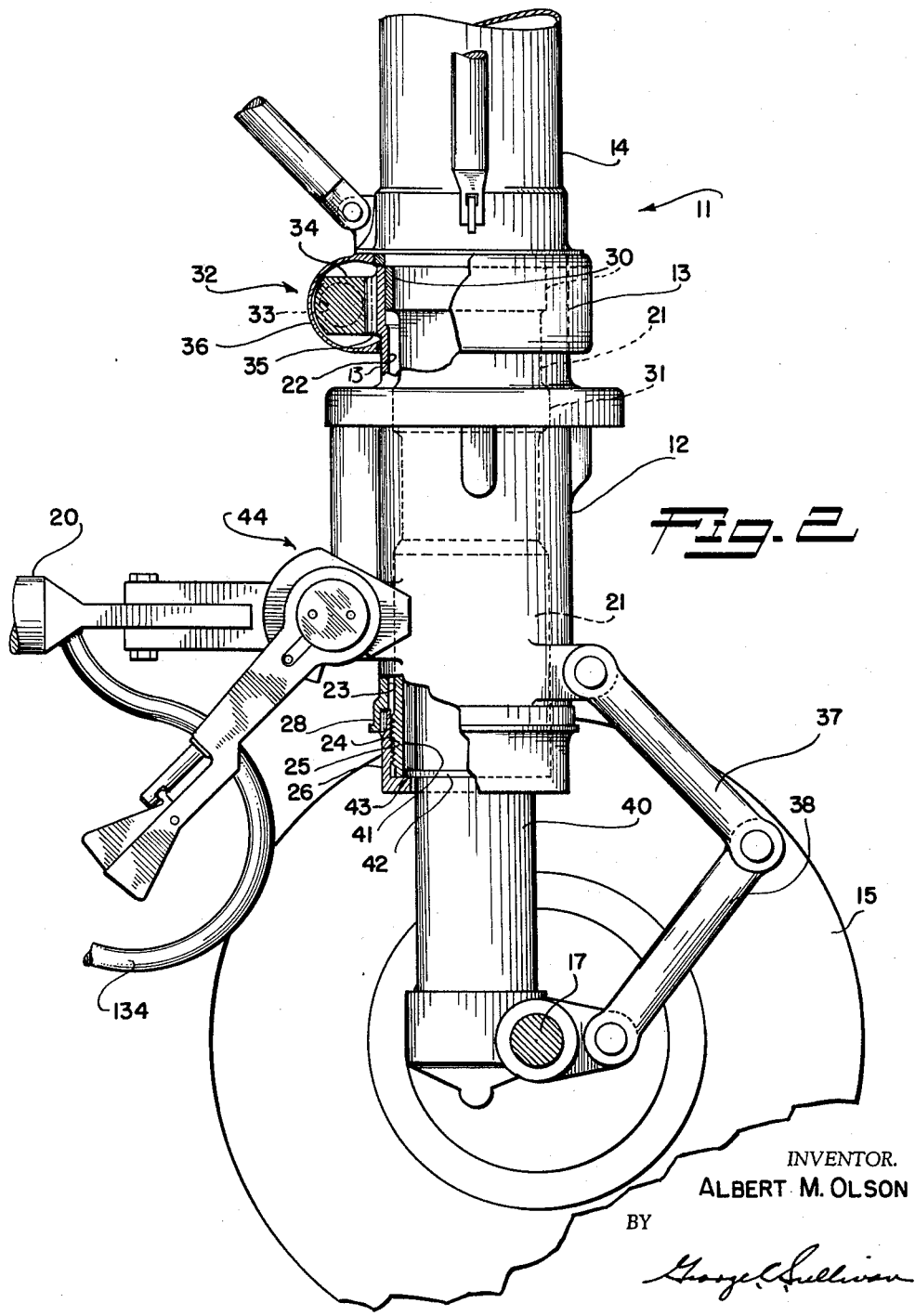

INVENTOR.
ALBERT M. OLSON

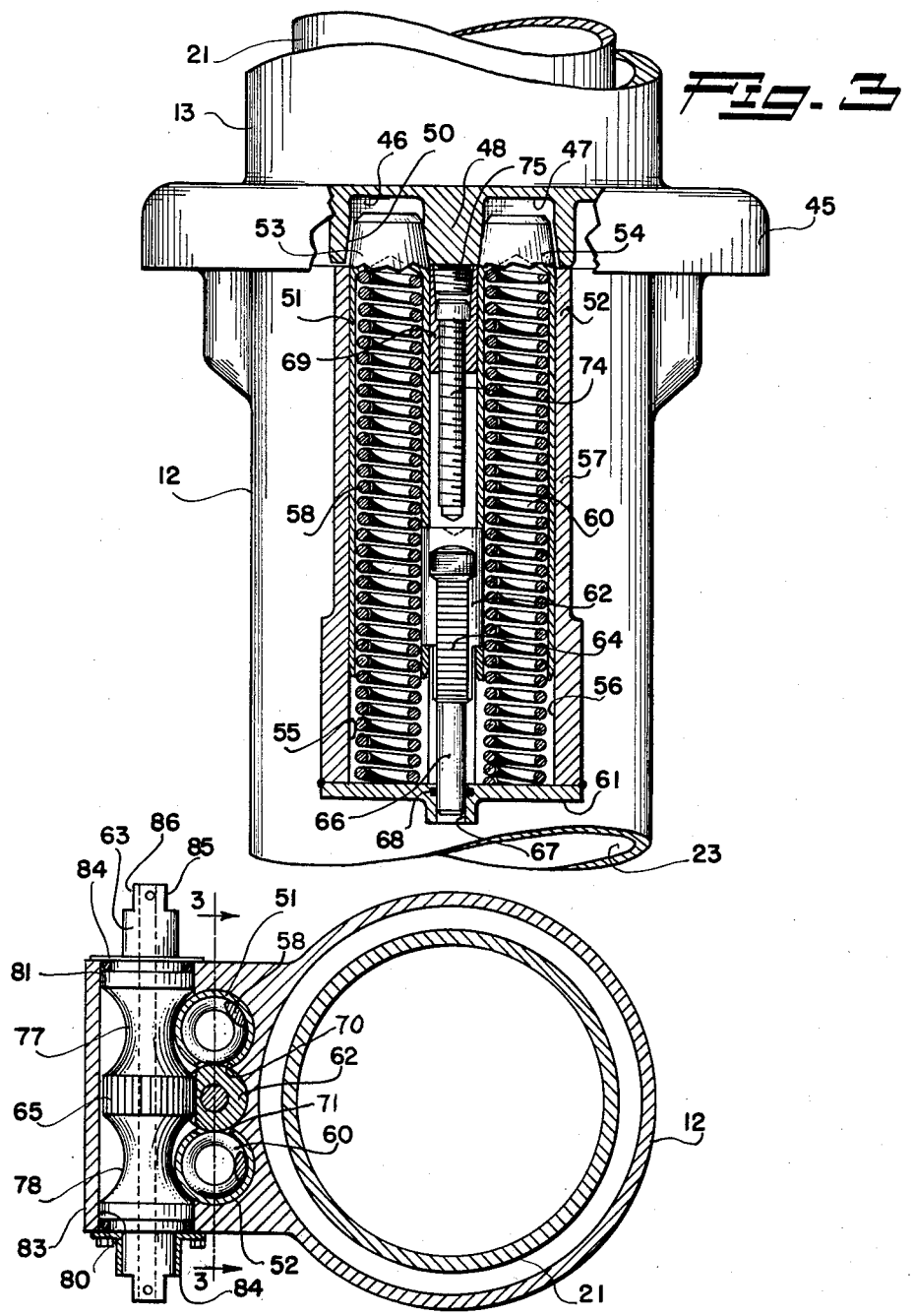

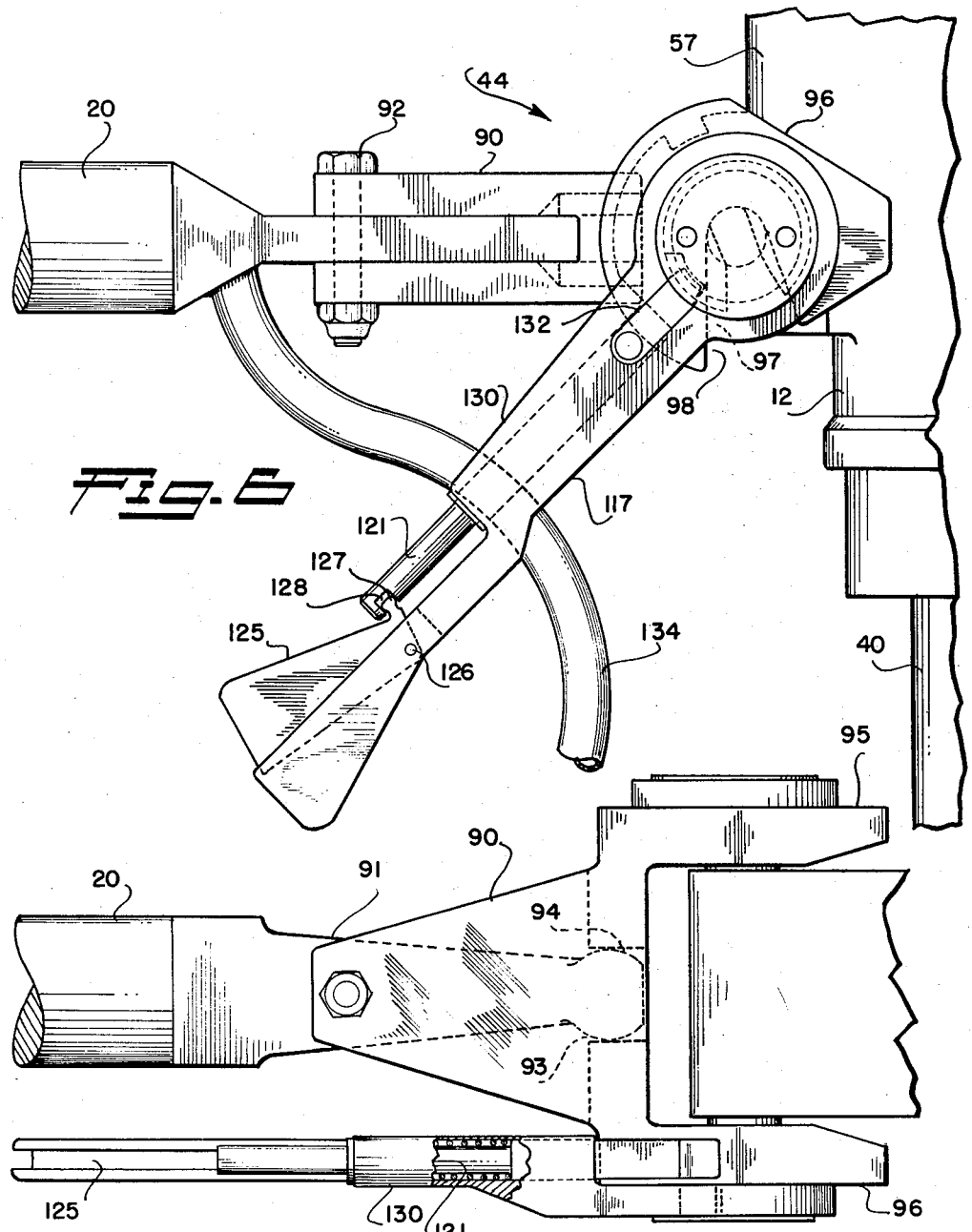

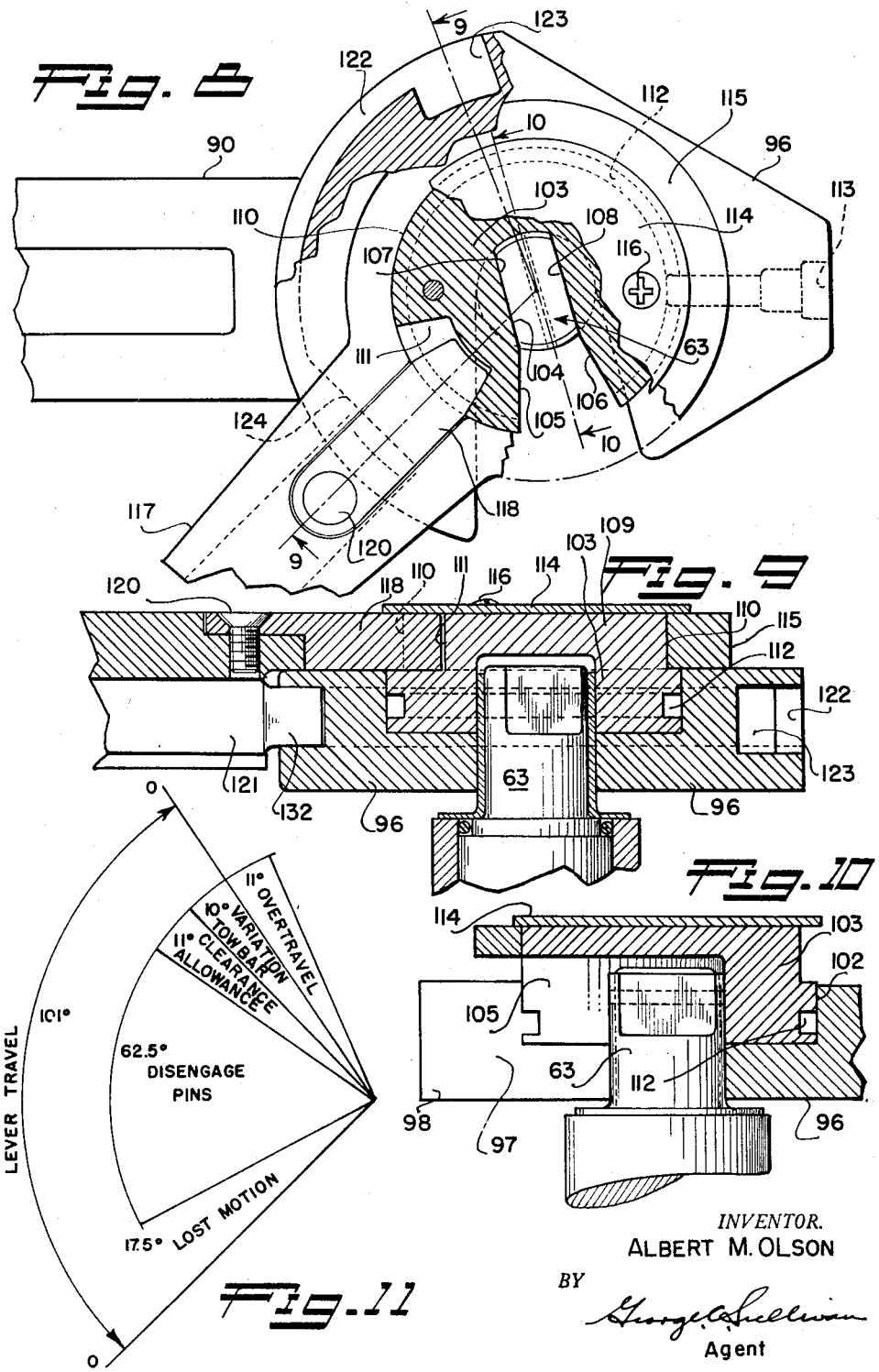

United States Patent Office 2,919,933
Patented Jan. 5, 1960

2,919,933

LANDING GEAR INTERLOCKING MECHANISM FOR TOWING THE AIRCRAFT

Albert M. Olson, Sherman Oaks, Calif., assignor to Lockheed Aircraft Corporation, Burbank, Calif.

Application July 12, 1957, Serial No. 671,470

5 Claims. (Cl. 280—442)

This invention relates to interlocking mechanisms and more particularly to a mechanism for selectively interconnecting a movable structure to a fixed structure in a fail-safe fashion.

Many of the airplanes being produced in the aircraft industry today are of the so called "tricycle" landing gear type having a pair of main landing wheels and a nose wheel. During take off and landing of the airplane, it is absolutely required that the nose wheel be non-castering and suitably secured to the nose wheel strut so that directional control of the airplane is achieved under control of the pilot via the airplane's engines. However, during maintenance or service operations or for relocating airplanes on an airfield, it is important that the nose wheel be rotatable normal to the direction of airplane travel and preferably free castering so that directional control of the airplane may be achieved by a tow truck connected to the tricycle landing gear via a towing bar.

Difficulties have been encountered when changing from the castering to the non-castering condition of nose wheel operation which are due to the fact that maintenance and service personnel sometimes inadvertently detach the towing bar from the nose wheel without assurance that the wheel has been properly locked in its fixed condition with respect to the nose wheel strut. This error has caused many airplanes to be damaged during take off or landing. Therefore, a need has long existed for an automatic interlocking mechanism which will place the landing gear in either of two conditions of operation controllable by the attachment or detachment of towing equipment.

Accordingly, the present invention obviates difficulties associated with conditioning the nose wheel in either its castering or non-castering condition by providing an interlocking mechanism carried by the nose wheel strut and readily actuated by towing apparatus which causes the nose wheel to become secured to or unsecured to the fixed structure of the aircraft upon the attachment or detachment of the towing apparatus. In this manner, the towing apparatus cannot be detached from the nose wheel unless the interlocking mechanism secures the nose wheel in its non-castering condition and attachment of the towing apparatus to the nose wheel conditions the nose wheel to its castering condition. Therefore, the element of human error normally existing with conventional towing apparatus and nose wheels is obviated and a "fail-safe" interlocking mechanism is employed which greatly affects the servicing of aircraft and reliability of airplane operation.

It is an object of the present invention to provide a novel nose wheel interlocking mechanism as a safety feature on an aircraft to reduce the possibility of human error in ground handling of the airplane.

Another object of the present invention is to provide a simple mechanical construction for accomplishing the setting of the nose wheel of a tricycle landing gear type airplane into either a condition of free castering or a condition of non-castering automatically upon the attachment or detachment of the towing apparatus.

Still another object of the present invention is to provide a novel means for damping undesirable nose wheel oscillation or completely obviating undesirable nose wheel oscillation.

Another object of the present invention is to provide a manually operable mechanism carried by aircraft towing equipment which is readily engageable with interlocking mechanism provided on the nose wheel so that the nose wheel may be placed in a condition of free castering or a condition of non-castering upon the manual attachment or detachment of the towing apparatus.

Still a further object of the present invention is to provide means for coupling the tow bar to a nose wheel of a tricycle landing gear type airplane so that the operation of coupling the tow bar to the nose wheel operates interlocking mechanisms carried by the nose wheel.

These objects and features are described in the following specification with reference to the accompanying drawings in which:

Figure 2 is an elevational view of a nose wheel of the tricycle landing gear type airplane of Figure 1 showing a suitable steering mechanism for the wheel operable by means of a tow bar or remotely from the interior of the airplane;

Figure 3 is a front sectional view of the interlocking mechanism taken in the direction of arrows 3—3 of Figure 5;

Figure 5 is a plan view in section of the interlocking mechanism taken in the direction of arrows 5—5 of Figure 4;

Figure 6 is a side view of the tow bar showing mechanism in accordance with the present invention coupled to the interlocking mechanism carried by the nose wheel;

Figure 7 is a plan view of the tow bar and its attachment to the interlocking mechanism as shown in Figure 6;

Figure 8 is a side view, partly in section, showing the tow bar attached to the operating mechanism of the interlocking mechanism shown in Figure 6;

Figure 9 is a sectional view taken in the direction of arrows 9—9 of Figure 8;

Figure 10 is a sectional view taken in the direction of arrows 10—10 of Figure 8; and Figure 11 is a diagrammatic drawing illustrating the functions accomplished by the movement of lever travel incorporated with the tow bar.

Figure 1:
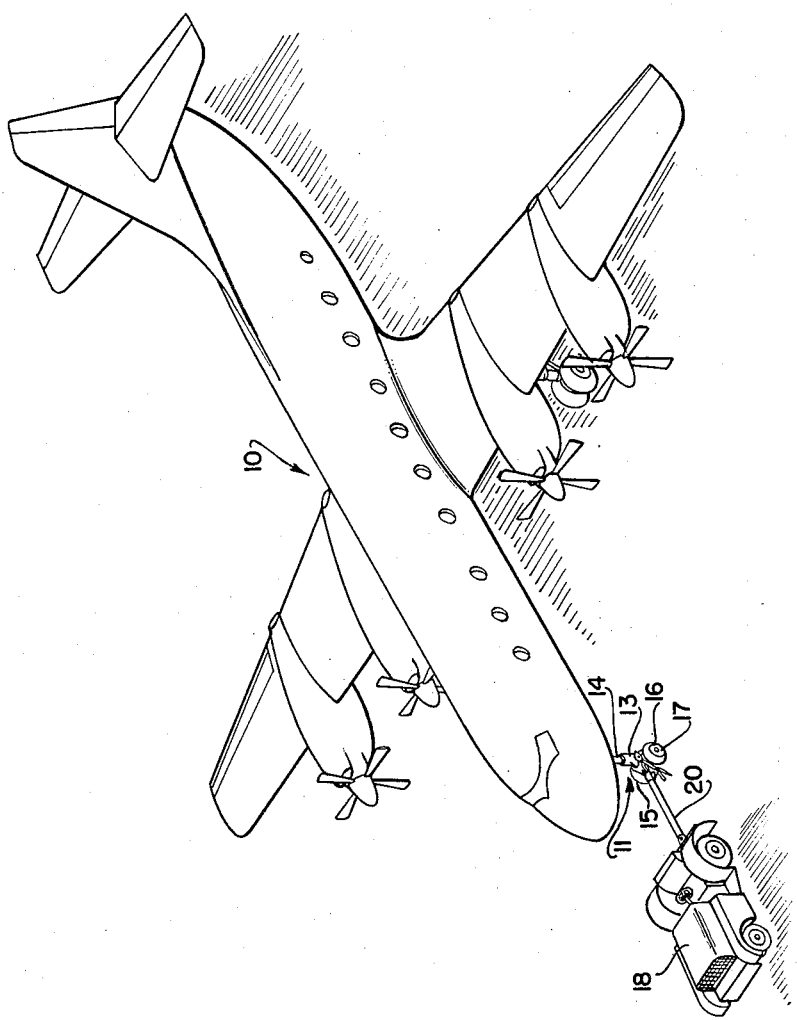
Figure 1 is a perspective view of a tricycle landing gear type airplane being towed by another vehicle employing the present invention.

With reference to Figure 1, an airplane 10 is shown of a conventional tricycle landing gear type including the incorporation of a nose strut 11 pivotally carried by the airplane which includes a casing 12, a housing 13 and a substantially upright section 14 respectively, wherein the casing and housing are axially movable and rotatable relative to section 14 which is pivotally fixed to the airplane itself. A pair of nose wheels 15 and 16 are carried by the nose strut on a common axle 17.

The steering of the airplane normally is under control of the airplane pilot via mechanism, to be described later, manually operated by the pilot which is suitably coupled to the housing 13 and section 14. However, in the absence of pilot control, for such operations as airplane servicing and maintenance, a towing means such as a self-powered tow truck 18 may be employed to pull the airplane about the airport. In order to conveniently steer the airplane about relatively sharp turn angles, it is important that the nose wheels be in a free castering condition of operation about the central axis of section 14. On the other hand, when the airplane is taking off from the ground or is landing, it is equally important that the nose wheels be in a non-castering condition of operation. The mechanism for achieving either of these two conditions of operation will be described later.

Tow truck 18 is connected to the nose strut of the airplane by means of tow bar 20 pivotally secured on one of its ends to the rear of the truck and fastened to the nose strut on its opposing end so that movement and direction of the airplane will follow the movement and direction of the tow truck.

With reference to Figure 2, nose strut 11 of the tricycle landing gear airplane 10 of Figure 1 is shown in accordance with the present invention which includes casing 12, housing 13 and a substantially upright section 14 pivotally carried by the fuselage of the airplane. Casing 12 and housing 13 are axially movable and rotatable relative to the central axis of section 14. An internal bore (not shown) provided in section 14 carries a hydraulic cylinder 21 suitably attached to section 14 which passes through internal bores 22 and 23 provided in the housing and casing respectively. The extreme lower end of the hydraulic cylinder is provided with a plurality of threads 24 which engage with internal threads 25 provided on a lower steering collar 26. Lower steering collar 26 is configured for receiving a mating configured member 28 provided on the lower end of casing 12. In this manner of construction, it can be seen that casing 12 is adequately supported by the hydraulic cylinder via the lower steering collar 26. Housing 13 is carried on the upper end of casing 12 opposite to its end connected to the lower steering collar 26. Housing 13 is held in position by means of a pair of bearing surfaces 30 and 31 carried on the hydraulic cylinder 21 which mate with internal bore 22 of the housing.

Housing 13 also carries steering mechanism 32 which is of the conventional screw jack type having a screw 33 rotatably engageable with a nut 34 which, in turn, rides on and is engageable with a plurality of teeth 35 integrally formed about the outer periphery of housing 13. The steering mechanism 32 is protected from environmental conditions by a cover 36. It should be noted that the steering mechanism does not comprise a part of the present invention and that any suitable steering mechanism can be employed with the present invention.

The rotation of housing 13 and casing 12 is transferred to the wheels 15 and 16 via a pair of connected torque arms 37 and 38 which are attached and connected between casing 12 and axle 17. Furthermore, rotation of the housing and casing is also translated into rotation of a piston rod 40 connected to axle 17 which passes through a bore 41 of hydraulic cylinder 21. Piston rod 40 is provided with an annular retaining ring 42 which engages with a lip 43 provided on the lower steering collar 26 which prevents the piston rod from dropping away from hydraulic cylinder 21.

In addition to the ability of the steering mechanism 32 to rotate casing 12, rotation may be achieved by means of tow bar 20 attached to the casing by means of mechanism 44, to be described later with reference to other figures.

In reference to Figure 3, mechanism is shown which detachably connects casing 12 with housing 13 so that at certain predetermined times casing 12 and housing 13 rotate as one member while at other times casing 12 and housing 13 may rotate independently with respect to each other. Housing 13 is provided with an annular flange 45 about its lower end having a pair of receptacles 46 and 47 separated by a common member 48. Each receptacle is configured with a countersunk surface 50 so that a slight taper is provided at the entrance of each receptacle.

The mechanisms for connecting the casing 12 with housing 13 include a pair of elongated pins 51 and 52 having tapered surfaces 53 and 54. Pins 51 and 52 are slidably mounted within a pair of passages 55 and 56 respectively which are provided within a thickened portion 57 integrally formed on the casing 12. The pins are hollow and are resiliently mounted within their respective passages by means of a pair of compression springs 58 and 60 disposed within each hollow which urge the pins upward against a bottom member 61 welded to thickened portion 57 of casing 12. Passages 55 and 56 are so arranged that the travel of pins 51 and 52 cause the engagement of their respective tapered surfaces 53 and 54 with the countersunk surfaces 50 of member 48 associated with receptacles 46 and 47. This arrangement also serves to prevent any possible oscillations of the wheels and casing 12 with respect to the housing 13 when the pins are engaged with their respective receptacles. This mechanism serves as a shimmy damper as well as an interlocking mechanism. It is to be understood that a single pin may be employed rather than the double pin arrangement as shown without departing from the spirit and scope of the present invention.

Figure 4:
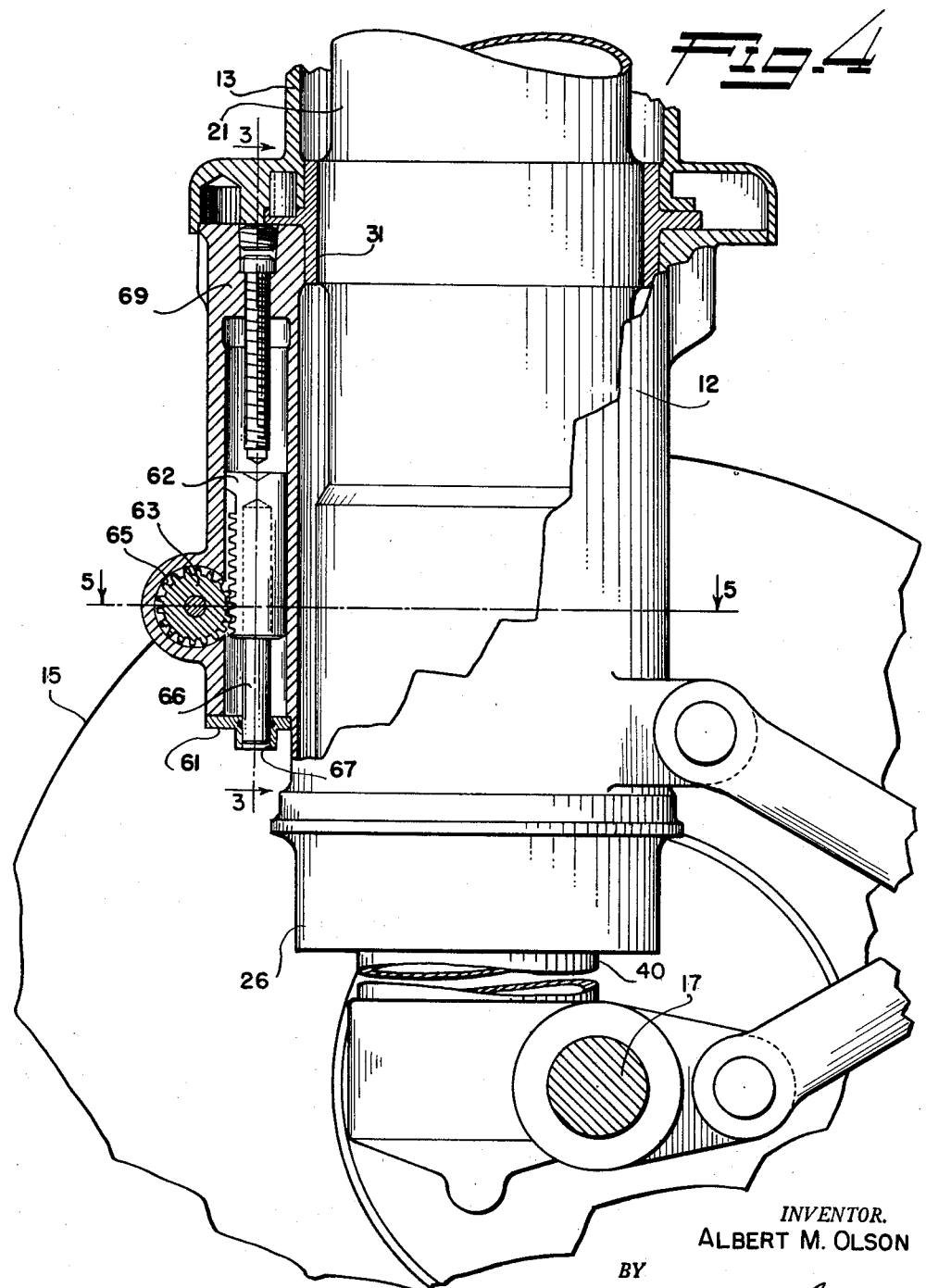
Figure 4 is a side elevational view partly in section of the nose wheel of Figure 3 exposing the interlocking mechanism in accordance with the present invention.

With reference to Figures 3, 4 and 5, actuating means are shown for positioning the pair of pins within their respective passages into and out of engagement with receptacles 46 and 47. This means comprises a rack 62 disposed between the pair of pins movable in response to the rotation of a member 63. Rack 62 is provided with a plurality of teeth 64 engageable with pinion teeth 65 carried on member 63 and the rack is slidably mounted on a guide rod 66 adapted to slide within a hole 67 provided in the bottom 61. A small O resilient ring 68 is employed to reduce friction between the rod 66 and hole 67 and to seal the passages from external environmental influences. Each of the pins is provided with a cut-out portion 70 and 71 located on their sides facing each other which receives a portion of rack 62, as shown more clearly in Figure 5, so that movement of the rack upward or downward carries the pins in the same direction. A screw stop 74 is provided to limit the upward movement of rack 62 and may be adjusted by rotating screw 74 within a bore 75 provided in a pin guide element 69 integrally formed in thickened portion 67.

Member 63 includes a plurality of teeth 65 disposed about its central periphery engageable with teeth 64 of rack 62 so that rotary motion of member 63 is transferred to vertical displacement of rack 62. Furthermore, member 63 includes a pair of shaped recesses 77 and 78 separated by the plurality of teeth which serve to accommodate the configuration of pins 51 and 52 respectively.

Member 63 is rotatably mounted through a pair of apertures 80 and 81 located on opposite sides of thickened portion 57 and is retained therein by means of a retaining member 84 associated with each end of member 63. The ends of member 63 are provided with a pair of flat surfaces 85 and 86 which are preferably hard chrome plated and which are adapted to be received by mechanism 44 for attaching tow bar 20 to casing 12.

With reference to Figures 6 and 7, tow bar 20 is joined to casing 12 by means of mechanism generally referred to by arrow 44 which comprises a link 90 attached to a piece 91 carried by bar 20 by means of a nut and bolt arrangement 92 so that a semi-spherical member 93 is disposed within receptacle 94 provided between a pair of C-shaped clamps 95 and 96 integrally formed with link 90. Each clamp is provided with a cut-out 97 having an entrance 98 adaptable to accommodate the round portion adjacent the flat surfaces 85 and 86 of members 63 respectively.

C shaped clamp 96 is provided with an annular recess 102, as in Figure 10, which rotatably carries a core 103. Core 103 is provided with a cut-out 104 having a pair of surfaces 105 and 106, shown in Figure 8, which serve as an entrance to cut-out 104 and as a guiding means for the ends of member 63. Cut-out 104 is further provided with a second pair of surfaces 107 and 108 which are constructed and arranged to mate with surfaces 85 and 86 carried by the end of member 63. Core 103 is provided with a portion 109 having an annular surface 110 and a notch 111 provided therein. An annular groove 112 is formed about the periphery of core 103 for receiving the end of a retaining pin 113 which serves to maintain core 103 within recess 102. Rotatably carried within groove 110 is a handle 115 which is held in place by a disk 114 secured to core 103 by screws 116. Handle 115 includes an outwardly extending arm 117 provided with a key 118 recessed within the handle and secured thereto by means of a suitable screw 120. This arrangement permanently maintains key 118 within slot 111. Slot 111 is of substantially greater width than the width of key 118 in order to allow for pin wear and allowance of accumulated tolerances.

Arm 117 of handle 115 is provided with a plunger 121 enclosed in a casing 130, shown in Figure 6, having plunger key 132 adaptable to travel within a groove 122 forming a semi-circle about the periphery of C shaped clamp 96. Groove 122 is provided with a slot 123 at one end and provided with a tapered surface 124 on its end opposite to slot 123. The plunger is made operable to ride within groove 122 by means of a pivoted lever 125 secured to arm 117 by pivot 126. Connection between plunger 121 and lever 125 is accomplished by means of an integral finger 127 on the lever which is received into an aperture 128 provided in the end of the plunger opposite to its end held within groove 122.

As shown more clearly in Figure 7, plunger 121 is spring tensioned within a casing 130 by spring 131 acting between the end of casing 130 and a plunger key 132.

To protect the handle and arm from being inadvertently dropped on the ground which may cause damage, a guard 134 is employed which is arranged to strike the ground first and thereby protect mechanism 44. Guard 134 may also serve as a rest which supports the tow bar on the ground when not connected to the nose landing gear.

Actual operation will be described with reference to the accompanying figures wherein tow truck 18 carrying tow bar 20 is positioned forward of airplane 10 approximately in alignment with the central vertical axis of the airplane. Preferably, wheels 15 and 16 carried by the nose strut 11 are directed in a position so that airplane 10 may be moved forward.

As is shown in Figure 6, arm 117 connected to handle 115 is in its downward position so that entrance 98 of C shaped clamp 96 is in alignment with the cut-out 104 provided in rotor 103 as defined by surfaces 105 and 106 so that mechanism 44 may be engaged with the opposing ends of member 63 and the flat surfaces, such as surfaces 85 and 86, of member 63 may be received within the cut-out portions of the C shaped clamp and core.

Upon the proper seating of the opposing ends of member 63 within the cut-out portion 97 of C-shaped clamps 95 and 96 and cut-out portion 104 defined by surfaces 105 and 106 of rotor 103, lever 125 may be pivoted about point 126 so that plunger 121 causes key 132 to ride out of engagement with flat surface 124 provided in groove 122 of clamp 96 against its spring tension. While so pivoted, arm 117 may be manually raised to rotate handle 115. Rotation of handle 115 urges key 118 into engagement with the defining walls of notch 111 carried by rotor 103. This engagement causes the rotor 103 to rotate in accordance with further rotation of handle 115 since key 118 is secured to arm 117 by screw 120. Rotation of arm 117 and handle 115 continues with key 132 riding within groove 122 until key 132 drops into slot 123. At this time, rotor 103 has been rotated beyond the point where its cut-out portion 104 is in alignment with the cut-out portion 97 of clamp 96 so that the ends of member 63 are restricted from leaving the confines of the cut-out portions.

With reference to Figures 3 and 4, it is easily seen that rotation of member 63 via actuation of arm 117 of handle 115 causes the meshing of teeth 65 carried on member 63 with teeth 64 provided on rack 62. Clockwise rotation of member 63 causes rack 62 to move down causing pins 51 and 52 to recede from recesses 46 and 47 provided in member 45 of collar 13.

With reference to Figure 11, the relationship is diagrammatically shown between handle and arm travel and the various operating parts of mechanism 44 and the interlocking pins 53 and 54. The initial 17.5 degrees of rotation of arm 117 represent lost motion existing before key 118 engages with the confining wall of notch 111 of core 103. Upon engagement, the next 62.5 degrees represents pin disengagement as the arm is moved in a clockwise direction followed by 11 degrees of rotation which insure clearance between the top surfaces of the pins and collar 13. The next 10 degrees allow for any tow bar variation encountered, such as bumps or inclines in the road. An added 11 degrees of over-travel is provided when the key 132 drops into slot 123.

It is to be noted that a feature of the present invention resides in the construction of member 63 so that its associated flat surfaces are approximately 15 degrees from its central vertical axis. This arrangement is provided so that C-shaped clamps 95 and 96 will easily slip from the ends of member 63 in the event arm 117 of handle 115 is not rotated prior to a pulling force being exerted by the tow truck.

Having described only typical forms of the invention I do not wish to be limited to the specific details herein set forth, but wish to reserve to myself any variations or modifications that may appear to those skilled in the art and fall within the scope of the following claims.

I claim:

1. An interlocking mechanism for detachably connecting a wheel assembly mounted in a relatively fixed structure from the fixed structure comprising, first collar means journaled on the support structure, second collar means journaled on the support structure and connected to rotate about the central axis of the support structure, pin means for interconnecting the first and second collar means for unrestricted joint movement, a rack and pinion arrangement carried on the second collar means operable to disengage the pin means from the first collar means, tow bar mechanism detachably connected to the rack and pinion arrangement having a manually rotatable handle carried thereon, and means provided on the handle for restricting disengagement of the handle from the rack and pinion arrangement when the pin means are disengaged from the first collar means.

2. A landing gear comprising, a first collar means journaled on a supporting structure, a second collar means journaled on the supporting structure and connected to a wheel assembly, a pair of pins movably carried on the second collar means for interconnecting the first and second collar means for joint movement, a toothed rack operably connected to the pair of pins, a pinion member rotatably carried by the second collar means having a plurality of teeth arranged to mesh with the toothed rack, a manually operated tow bar having cut-out portions adapted to receive the pinion member, and means provided on the tow bar for resisting disengagement of the tow bar from the pinion member when the pins are disengaged from the first collar means.

3. A landing gear comprising, a fixed structure carrying a wheel assembly adapted to rotate about the central axis of the fixed structure, interlocking means detachably connecting the wheel assembly to the fixed structure to restrict wheel assembly rotation; tow bar mechanism having cut-outs arranged to detachably couple with the interlocking means, means carried by the mechanism operably connected to the interlocking means for detachably connecting the wheel assembly to the fixed structure, and means adjacent the cut-outs for preventing disengagement of the tow bar mechanism from the interlocking means while the wheel assembly is unrestricted from rotating.

4. A landing gear comprising a wheel carrying member, a steering element on said member, a lock mechanism adapted to rotationally lock said element to said member and capable of release to enable relative rotation therebetween, a tow element, a connecting mechanism releasably connecting said tow element to said member, and means within said connecting mechanism cooperating with said lock mechanism to maintain it in release position as long as said tow element is connected to said member.

5. A landing gear comprising a cylinder member adapted to be mounted on an aircraft, a piston member telescoping into said cylinder member axially movable and rotatable relative thereto, a landing wheel journalled on said piston member, a steerable collar axially fixed and rotatable relative to one of said members, a lock assembly including a lock element carried by said one member rotationally fixed relative to said piston and operable from a locked position in which it engages said collar and prevents relative rotation therebetween and an unlocked position in which it disengages said collar and permits relative rotation therebetween, a tow bar, a connector releasably connecting said tow bar to said lock assembly, a portion of said lock assembly being engaged by said connector only when it connects said tow bar and assembly operating to maintain said lock element in said unlocked position.

References Cited in the file of this patent

UNITED STATES PATENTS

| | | |
|---|---|---|
| 2,391,608 | Wood | Dec. 25, 1945 |
| 2,468,669 | Holmes | Apr. 26, 1949 |
| 2,544,278 | Nickell | Mar. 6, 1951 |
| 2,745,612 | Cupp | May 15, 1956 |